Nov. 29, 1955　　　H. C. FISCHER　　　2,724,879
MACHINE FOR MANUFACTURING SHELL MOLDS
Filed July 8, 1952　　　　　　　　　　　　4 Sheets-Sheet 1

INVENTOR.
Herbert Corliss Fischer
BY Maxwell Fish
ATTORNEY

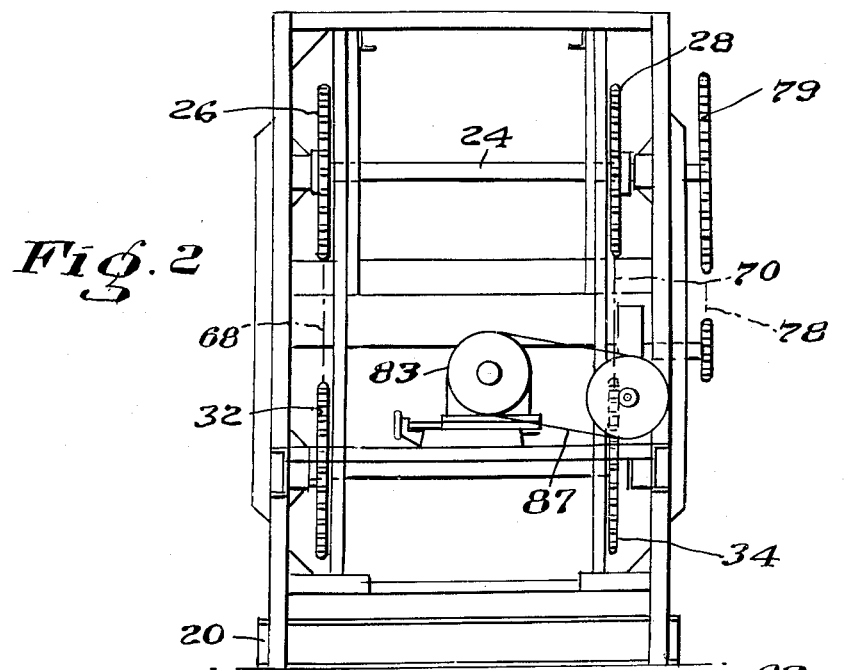
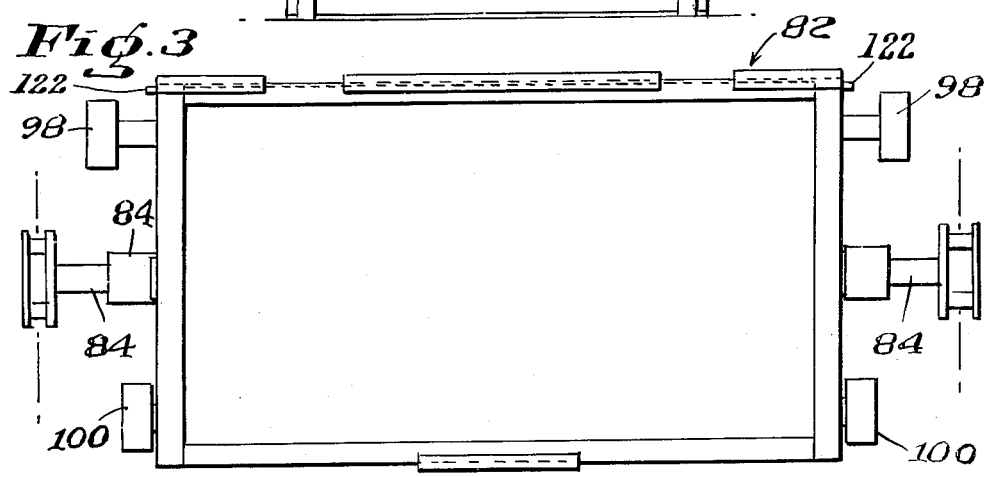
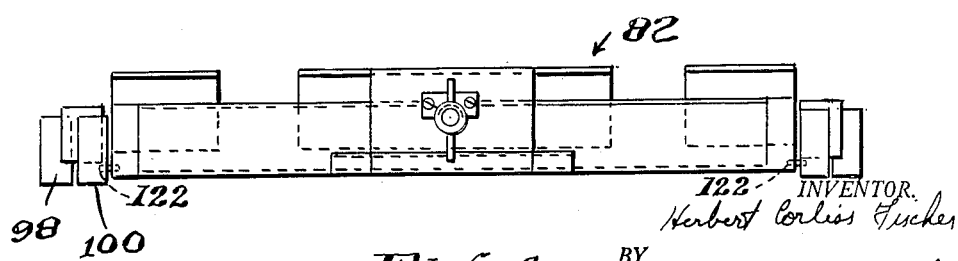

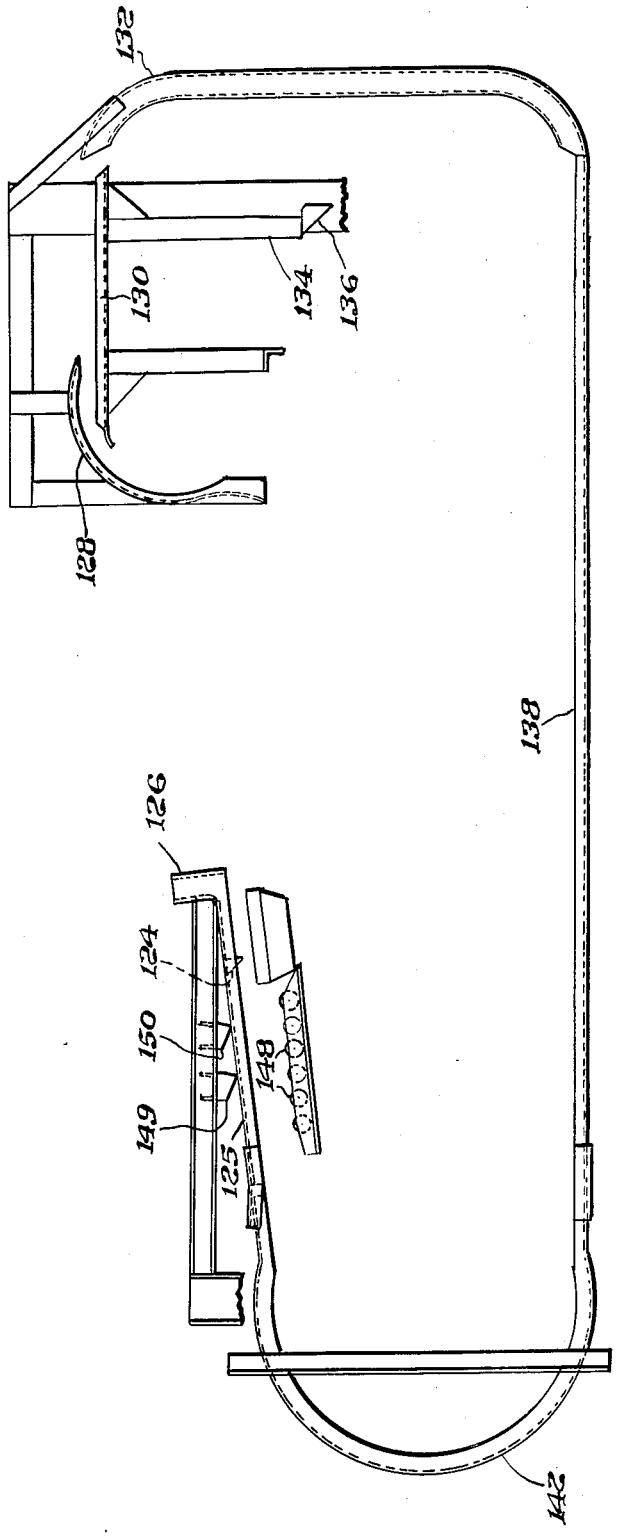

Nov. 29, 1955     H. C. FISCHER     2,724,879
MACHINE FOR MANUFACTURING SHELL MOLDS
Filed July 8, 1952     4 Sheets-Sheet 4
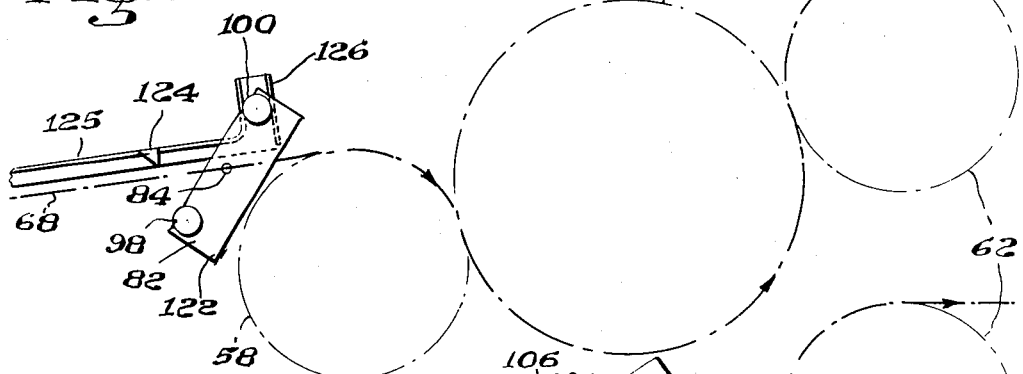
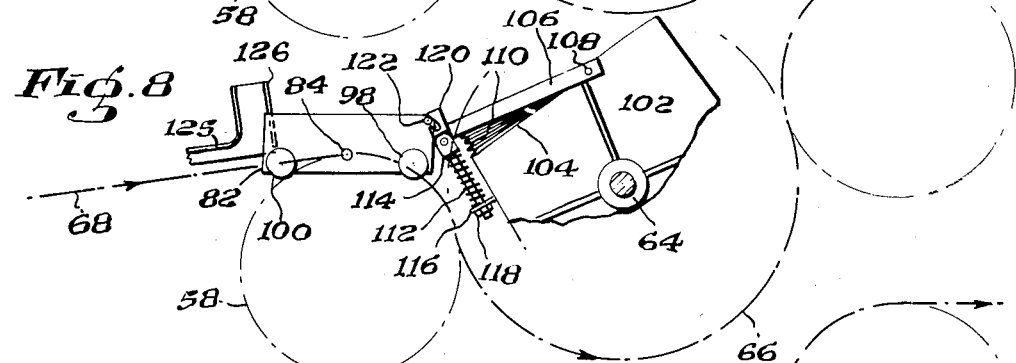
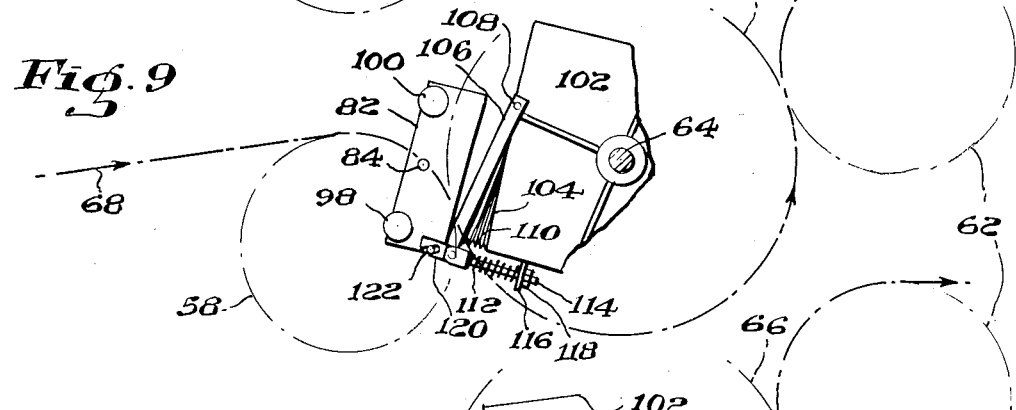
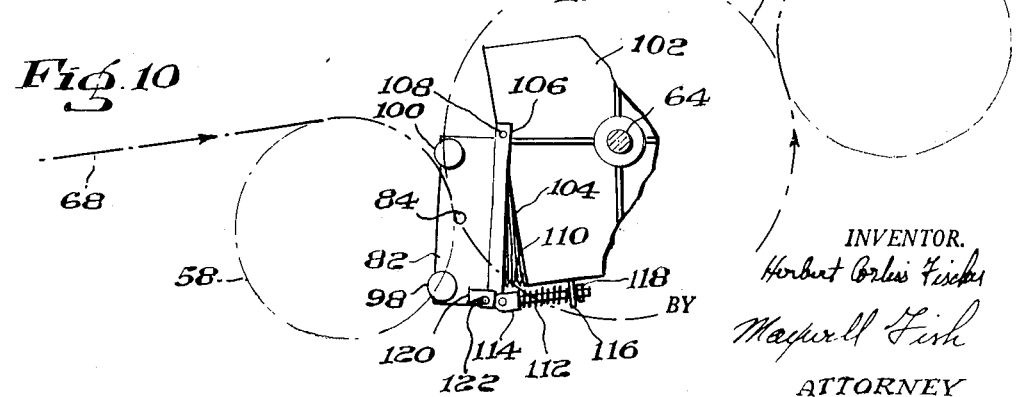
INVENTOR.
Herbert Corliss Fischer
BY Maxwell Fish
ATTORNEY

United States Patent Office 2,724,879
Patented Nov. 29, 1955

2,724,879

MACHINE FOR MANUFACTURING SHELL MOLDS

Herbert Corliss Fischer, Wellesley Hills, Mass.

Application July 8, 1952, Serial No. 297,724

15 Claims. (Cl. 22—20)

The present invention relates to a machine for manufacturing shell molds from a thermosetting mold mix.

The present machine is particularly intended for the manufacture of gas-permeable foundry molds and the like in accordance with a method which comprises the steps of charging a mixture combining a dry loose inorganic molding material and a binder component therefor, having the property of softening, becoming adhesive and then hardening at elevated temperatures, to a heated pattern or core box in which said component softens and becomes adhesive, whereby the mixture becomes bonded on the work surface in the form of a shell of a shape determined by the design of such surface, continuing the charging of the mixture until the shell has attained a desired thickness, removing any excess mixture from the pattern box and ultimately removing the gas-permeable shell therefrom in a hardened condition.

It is a principal object of the present invention to provide a machine for the manufacture of molds and the like in accordance with the method above referred to which is particularly adapted for continuous automatic operation as a production machine.

It is a further object of the invention to provide a novel and improved machine for the production of molds in accordance with the process above described which is simple in construction and is adapted to operate with the maximum efficiency to produce molds of the highest quality.

With these and other objects in view which may hereinafter appear the several features of the invention consists in devices, combinations and arrangement of parts hereinafter described and claimed, which together with the advantages to be obtained thereby will be readily understood by one skilled in the art from the following description taken in connection with the accompanying drawings in which;

Fig. 2 is an end view of the machine shown in Figs. 1 and 2 looking from the right;

Fig. 3 is a detail plan view of one of the pattern plate supporting trucks;

Fig. 4 is a side elevation of the truck shown in Fig. 3;

Figure 1:
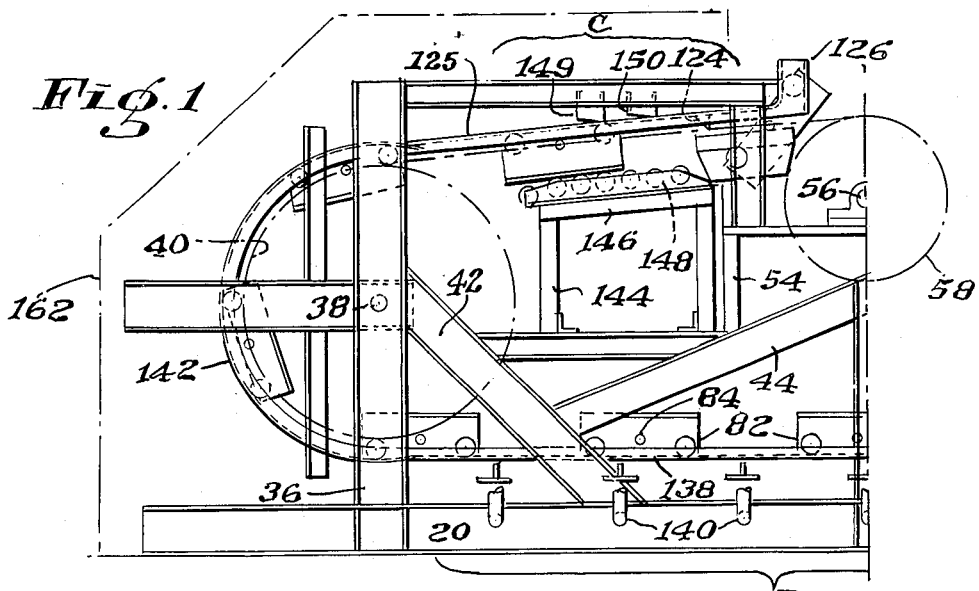
Fig. 1 is a view in side elevation of the left hand half of a machine embodying in a preferred form the several features of the invention.
Figure 1A:
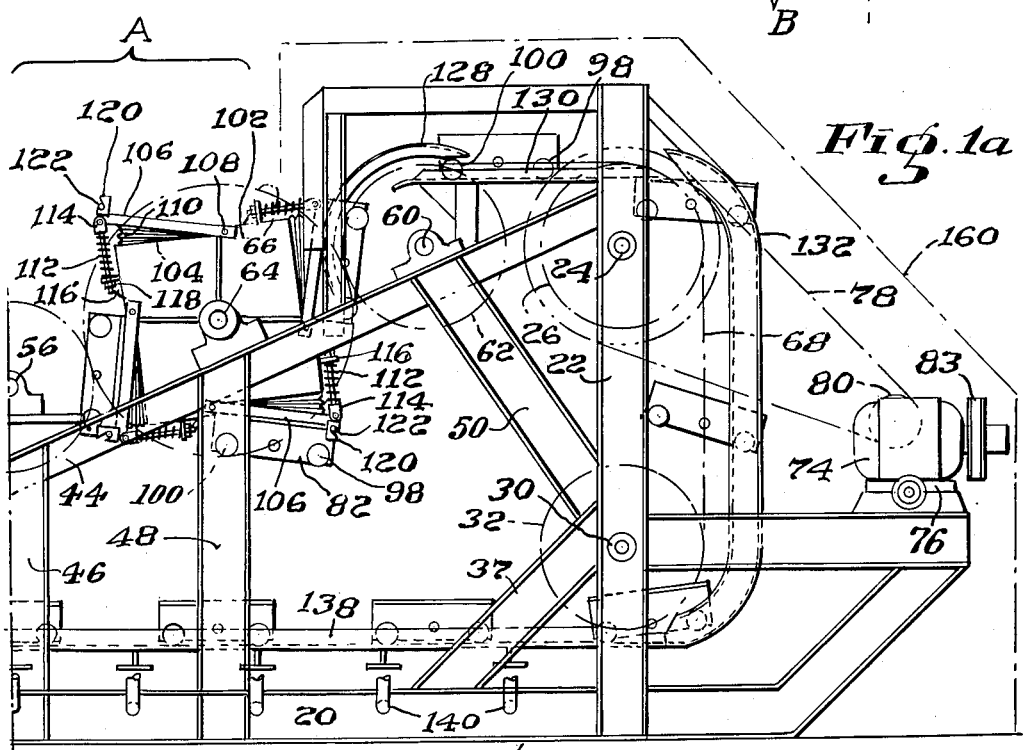
Fig. 1a is a view in side elevation of the right hand half of the machine shown in Fig. 1.
Figure 5:
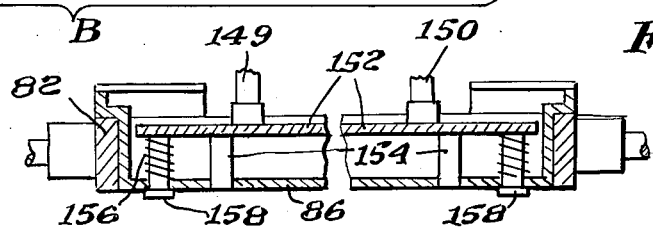
Fig. 5 is a sectional view in elevation of one of the trucks with a pattern plate and its spring mounted ejector plate in position on the truck, the truck further being shown in position at the ejector station.

Fig. 6 is a detailed view of the guideway on which the trucks 82 ride, and Figs. 7–10 inclusive, are a series of diagrammatic views showing successive positions of a truck 82 and its associated mold during that portion of its travel in which it is brought into operative relation to an aperture in the drum 102;

Fig. 7 showing the truck as it is swung from an upside down position to a rightside up position by the engagement of the rollers 100 with the vertically disposed dead-end track 126;

Fig. 8 showing the truck in a rightside up position at the moment of engagement of the pins 122 with the hooks 120;

Fig. 9 showing the truck as it is brought toward its closed position with relation to the flange 106; and Fig. 10 showing the truck 82 fully engaged in its closed position against the flange 106.

The machine illustrated in the drawings takes the form of a relatively long narrow rectangular base 20, and a series of uprights and other supporting members which are mounted in pairs on the front and rear rails of the base 20. Portions of the frame include a pair of uprights 22 at the right hand end of the base 20 on which are mounted a sprocket drive shaft 24 with sprockets 26 and 28 spaced apart substantially the width of the frame and a sprocket shaft 30 on which are carried two spaced apart sprockets 32 and 34. A pair of uprights 36 located at the left hand end of the machine provide support for a sprocket shaft 38 and two spaced apart sprockets 40. The uprights 36 are reinforced by diagonal struts 42, and the uprights 22 are similarly reinforced by diagonal struts 37. The struts 42 are connected with the right hand uprights 22 by diagonally placed supports 44. Diagonal supports 44 are in turn supported along their length by uprights 46 and 48 and by diagonal supports 50.

Substantially at the midpoint of the diagonal supports 44 there is mounted a rotatable shaft 64, to which are secured sprockets 66. The shaft 64 carries a drum from which the thermosetting mold mix is supplied to the pattern plates as hereinafter to be more fully described. At each side of the drum shaft 64 there are provided two guide wheel supporting shafts 56 and 60. The shaft 56 is rotatably supported on platforms 54 carried by the supports 44 and has mounted thereon two guide wheels 58. The shaft 60 is rotatably supported from the diagonal supports 44 and has mounted thereon two guide wheels 62.

It will be understood that the several sprockets and guide wheels above described are supported in pairs respectively at the front and the rear of the machine in alignment to receive a pair of sprocket chains 68 and 70 which move in parallel paths in a clockwise direction as shown in Figs. 1 and 2. The sprockets and sprocket chains are continuously driven at a controlled rate from an electric motor 74 which is supported at the right end of the machine on a platform 76. The motor is connected with the sprocket drive shaft 24 by means of a belt 78 which passes around a pulley 79 on sprocket shaft 24 and around a pulley 80 forming part of a reduction gear unit connected by a belt 87 with a pulley 83 on the armature shaft of the motor.

The sprocket chains 68 and 70 provides support for sixteen identical pattern plate supporting trucks one of which is particularly designated at 82. Each truck 82 comprises a rectangular frame rotatably mounted between the sprocket chains on two pivot pins 84 secured into the respective sprocket chains. The truck 82 is adapted to receive a pattern plate 86 which is secured in position by any suitable means such as over-edge brackets and a spring latch mounted on the truck frame.

The trucks 82 supported on the axis provided by the pivot pins 84 connected with the sprocket chains 68 and 70 are further supported and controlled during movement along the path of the sprocket chain by means of guideways and other positioning devices hereinafter to be more fully described which serve at all times to control the angular positions of the several trucks together with the pattern plates supported thereon so that the trucks will occupy a predetermined angular position. For engagement with the guideways referred to each frame or truck is provided at its leading edge with a pair of rollers 98 which are spaced a substantial distance from the two ends of the truck which carry the pivots 84. The truck is further provided at its trailing end with two rollers 100 which are spaced closely to the two ends of the truck 82, and are therefore of narrower gauge than the rollers 98.

The machine which forms the subject matter of the present invention is particularly constructed and arranged for continuous automatic operation in which each of the several trucks in turn is passed through a mold forming station generally indicated at A at which the mold mix is applied to and built up to the desired depth on the pattern plate. The plate is then passed through a heating and curing station generally indicated at B at which the pattern plates and the molds deposited thereon are heated to completely cure the molds and to bring the individual plates up to the desired temperature. Finally the plate and mold is passed to a discharge station generally indicated at C at which the molds are discharged from the plates preparatory for delivery again to the mold forming station A.

The mold forming station A above referred to consists of a drum 102 which is mounted on the drum pivot shaft 64 between the two sprockets 66 so that it is continuously rotated in synchronism with the movement of the sprocket chains 68 and 70. The drum 102 which is arranged to contain a supply of mold forming mixture takes the form of a substantially rectangular box having four discharge openings 104, one on each side of the box extending along the length of the side and including slightly more than half the width of the side of the drum from the leading edge considered in the direction of rotation of the drum. Each of the openings 104 is formed with a rectangular frame or flange 106 which is superimposed on the edges of the opening 104 and is connected to the drum by pivots 108 to swing about an axis extending along the inner edge of the opening. The flange is connected to the edges of the opening by means of a collapsible bellows 110 fastened between the flange and the opening. The flange 106 and bellows 110 are normally maintained in an extended position by means of a spring 112 coiled about a rod 114 secured at one end to the flange 106 and at its other end arranged to extend through an aperture in an abutment 116 on the side of the drum. A nut 118 screw threaded to the lower end of the rod 114 serves to limit the outward swinging movement of the flange 106 under the influence of the spring 112. The flange 106 is also provided at its outer edge with two hooks 120 which are adapted for engagement with co-operating pins 122 projecting outwardly from each end of the truck substantially in line with its upper leading edge to cause the truck to be brought arcuately into the closing position with relation to the flange 106 and opening 104.

Each successive truck 82 and associated pattern plate is brought into an operative position in which it forms a closure for one of the openings 106 of the drum 102 in the following manner. The truck 82 when leaving the discharge station C is positively advanced toward the right on sprocket chains 68, 70 as viewed in Figs. 1 and 2. The wide gauge rollers 98, now in the trailing position because the truck is upside down, are engaged with a pair of downwardly projecting cam elements 124 supported on track 125 which overlies and extends beyond the discharge station causing the truck to rotate in a counterclockwise direction so that narrow gauge rollers 100 are moved upwardly into an upwardly extending dead end track 126 which serves with the rollers 100 as a fulcrum about which the truck 82 swings in a counterclockwise direction as it is carried bodily forward with sprocket chains 68, 70 engaging the trunnions 84. (See Fig. 7.) This swinging movement causes the truck to be returned to a right side up position and brings a pair of hooks 120 mounted on the outer edge of the flange 106 into engagement with the laterally extending pins 122 on the upper leading edge of the truck 82. At the same time the rotational movement of the truck about its axis 84 will cause the rollers 100 to ride out of the fulcrum slot 126. (See Fig. 8.)

With the continued rotation of the drum 102 the truck 82 hinged to the outer spring extended edge of the flange 102 in the manner above described and carried bodily forward by the movement of the trunnions 84 and sprocket chains 68, 70 is moved into a closing position with relation to the opening 104 in which the flange 102 engages firmly the outer edge portions of the pattern plate against the pressure of its spring 112. The movement of the truck 82 to its closed position is indicated in Figs. 9 and 10, of which Fig. 9 shows the truck 82 in the act of swinging against the flange 106 on the drum 102, and Fig. 10 shows the truck in its fully closed position.

As will be evident from an inspection of Figs. 7–10 inclusive, the continued advancing movement of the truck 82 on its sprocket chains 68, 70 as the rollers 100 leave the guideway 126 causes the pins 122 to engage the elongated rear face of the downwardly moving hook members 120 causing the truck 82 to be rotated clockwise as shown in Fig. 9, while at the same time the continued advancing of the truck 82 with its sprocket chains moves the pins 122 into locking position against the bottoms of the hooks.

Since the sprocket chains follow an arcuate path around the under side of the drum 102 riding on sprocket 66 the truck 82 and associated pattern plate is locked in the closure position with relation to the opening until the truck reaches a position at the further or right hand side of the drum substantially above a horizontal plane passing through the drum axis. As the sprocket chains 68, 70 now pass upwardly around guide wheels 62, the truck 82 is moved away from the drum. In order to assist in separating the truck and attached pattern plate guide wheels 98, 100 on the truck are caused to engage with a curved guideway 128 which causes the truck to be brought into the upright position indicated in Fig. 2. During the travel between guide wheels 62 and sprockets 26, the guide rollers 98, 100 of the truck 82 ride on a horizontal guideway 130. During the downward movement of the truck 82 from sprockets 26, 28 to sprockets 32, 34 the truck is maintained in a substantially horizontal position in the following manner. The leading wide gauge guide rollers 98 ride into closed guideways 132 which extend vertically downwardly and are spaced to the right of the sprocket chains 68, 70 sufficiently to maintain the truck 82 in the horizontal position indicated.

The truck 82 now passes along the lower part of the machine to sprocket 40, followers 98, 100 being supported on a guideway 138 which extends along the lower portion of the machine above the base frame 20. This portion of the machine comprises the heating and curing station B. It will be noted that the trucks 82 and pattern plates supported thereon pass over a series of gas burners 140, which are located under the trucks centrally of the machine along the length of the guideway 138, so that the pattern plates and molds deposited thereon are subjected to a controlled heat which is sufficient to raise and to maintain the temperature of the plates at an approximate 500° F.

During the travel of the truck around the sprocket wheel 40 the truck rollers 98 and 100 are supported in an outside arcuate guideway 142 which causes the truck to be turned to a wrong side up position when it reaches the upper side of the sprocket 40.

The truck now passes through the mold discharge station C causing the mold to be separated from the pattern plate and completing the cyclical operation of the machine. The mold discharge station C comprises a box like frame 144 on the upper struts 146 of which are mounted two parallel series of rollers 148 which are adapted to engage with and to support edges of the pattern plate during the passage of the inverted truck over the mold discharge station C. At the same time the truck is caused to pass beneath two cam elements 149, 150 which engage with abutments on a spring seated ejector plate 152 with ejector pins 154 mounted to project through the normally underside of the pattern plate so that the pins are forced downwardly through perforation in the plate 86 against the pressure of their compression supporting springs 156 on guide pins 158 to positively dislodge the mold and to cause it to drop into a suitable container (not shown) which is supported within the boxlike frame 144.

It will be understood that portions of the machine above described are preferably enclosed by sheet metal or other heat resisting material to form a series of ovens through which the several trucks 82 and pattern plates mounted thereon pass for the most efficient heating and maintenance of plate temperature. To this end and oven casing indicated at 160 in dot and dash lines is preferably provided to enclose the entire right hand end of the machine, and a second oven indicated at 162 in dot and dash lines encloses the left hand end of the machine so that only portions of the discharge station C and mold forming station A remain exposed to view.

A preferred embodiment of the invention in a mold manufacturing machine having been described, what is claimed is:

1. A machine for manufacturing shell molds from a dry free-flowing thermosetting mold mix, which comprises a machine frame, a mold mix containing drum supported to turn on a horizontal axis on said frame and having at least one discharge aperture, a plurality of pattern plates, a plate heating means, a mold discharge station, and a conveyor on which said plates are mounted and are successively moved into engagement with the drum in registry with said aperture upon each successive approach of said aperture and beneath the drum, past said plate heating means and mold discharge station, supporting guides mounted on the machine frame for guiding the movements of said plates on the conveyor, and means for driving said conveyor and the drum in synchronism with one another.

2. A machine for manufacturing shell molds from a dry free-flowing thermosetting mold mix which comprises a machine frame, a drum supported to turn on a horizontal axis on said frame, and having a plurality of mold mix discharge apertures spaced about the periphery thereof, a plurality of pattern plates adapted to be successively applied against said mold mix discharge apertures, a plate heating means, a conveyor on which said plates are mounted and are successively moved into engagement with the drum in registry with successive apertures and beneath the drum and past said plate heating means, and means for driving said conveyor and the drum in synchronism with one another.

3. A machine for manufacturing shell molds from a dry free-flowing thermosetting mold mix which comprises a machine frame, a drum supported to turn on a horizontal axis on said frame, and having four mold mix discharge apertures spaced about the periphery of the drum, a plurality of pattern plates adapted to be serially applied against the drum in registry with successively presented mold mix discharge apertures to form a closure therewith while said apertures are located beneath the drum, a plate heating means, a plate discharge station, and a conveyor on which said plates are mounted and are serially moved in a recurring cycle into engagement with successive apertures and beneath the drum, away from said apertures and past said plate heating means, and means for driving said conveyor and drum in synchronism with one another.

4. A machine for manufacturing shell molds from a dry free-flowing thermosetting mold mix, which comprises a machine frame, a drum supported to turn on a horizontal axis on said frame, and having at least one peripherally disposed mold mix discharge aperture, a plurality of pattern plates adapted to be successively applied against the drum in registry with said mold mix discharge aperture to form a closure therewith while said aperture turns beneath the drum, a plate heating means, a mold discharge station comprising means to eject the mold from the plate, and a conveyor on which said plates are mounted and are successively moved in a recurring cycle to form said closure while said aperture and pattern plate are located beneath the drum, and thereafter to convey said plates away from the drum and past the plate heating means, and past said plate discharge station, and means for driving said conveyor and drum in synchronism with one another.

5. A machine for manufacturing shell molds from a dry free-flowing thermosetting mold mix which comprises a machine frame, a drum supported to turn on a horizontal axis on said frame, and having at least one peripherally disposed mold mix discharge aperture, a plurality of pattern plates adapted to be successively applied against the drum in registry with said mold mix discharge aperture to form a closure therewith while said aperture is located beneath the drum, a plate heating means, a mold ejector means for ejecting the mold from the plate, a truck on which each plate is supported, a conveyor on which the trucks are mounted and are carried around and beneath the drum, past the plate heating means and past the mold ejector means, and means synchronizing the movements of the drum and conveyor.

6. A machine for manufacturing shell molds from a dry free-flowing thermosetting mold mix which comprises a machine frame, a drum supported to turn on a horizontal axis on said frame and having at least one peripherally disposed mold mix aperture, at least one pattern plate adapted to be applied against the drum in registry with said mold mix discharge aperture to form a closure therewith while said aperture is located beneath the drum, means for heating the plate, a truck on which the plate is supported, a conveyor comprising a pair of sprocket chains on which the truck is swivelly supported and moved around and beneath the drum and past said plate heating means, sprockets secured to turn with the drum around which said sprocket chains pass, and guiding means controlling the angular position of the truck on the sprocket chains during said movements.

7. In a machine for manufacturing shell molds from a dry free-flowing thermosetting mold mix, the combination of a machine frame, a drum supported to turn on a horizontal axis on said frame, and having at least one peripherally disposed mold mix discharge aperture comprising an opening, a flange overlying the edges of said opening and hinged to the trailing edge considered in the direction of rotation of the drum, a bellows connecting the flange with the edges of the opening, spring means connected between the flange and the drum maintaining the flange yieldably in an extended position with relation to the leading edge of the opening, a plurality of pattern plates each adapted to be fitted against said flange to form a closure for said aperture, trucks on which said plates are mounted, a conveyor moving in synchronism with the rotational movement of the drum and on which said trucks are moved around and beneath the drum, and guiding means controlling said movements of the trucks to apply and subsequently to move each truck and plate thereon away from said aperture.

8. In a machine for manufacturing shell molds from a dry free-flowing thermosetting mold mix, the combination of a machine frame, a drum having a substantially rectangular shape supported to turn on a horizontal axis on said frame and having along the leading edge of each side a mold mix discharge aperture comprising an opening, a flange overlying the edges of said opening and hinged to the drum to open along said leading edge, a bellows connecting the flange with the edges of the opening, spring means connected between the flange and the drum maintaining the flange and bellows in an extended position, a series of pattern plate supporting trucks, a conveyor connected to move in synchronism with the drum and on which said trucks are rotatably supported to be brought serially against the drum in registry with the several mold mix discharge apertures to form a closure with each aperture while the aperture is located beneath the drum, guiding means on the frame rotatably positioning the successive trucks in an upside-down position on the conveyor while approaching the drum, said guiding means including a swing fulcrum about which each truck swings to an upright position, means hinging the leading edge of the truck to said flange and thereby acting during continued rotation of the drum to turn the truck into a closed position against the aperture.

9. In a machine for manufacturing shell molds from a dry free-flowing thermosetting mold mix, the combination of a machine frame, a mold forming station comprising a drum supported to turn on a horizontal axis on said frame and having at least one mold mix discharge aperture in the peripheral surface thereof, a mold ejecting station comprising mold ejecting means, a conveyor comprising a pair of endless sprocket chains, a series of guide wheels including sprockets secured to turn with said drum around which guide wheels said sprocket chains pass in parallel relation over the ejector station and around and beneath the drum sprockets at the mold forming station and return, a plurality of pattern plates and plate supporting trucks pivotally mounted between the sprocket chains and spaced thereon to be applied serially against the drum in registry with said aperture to close each said aperture while turning under the drum axis, and guiding devices controlling the angular position of said trucks on the sprocket chains including means to present the trucks serially to the ejecting station in a wrong-side up position, means swinging each said truck serially to an upright position and connecting said truck with the drum to form a closure for the aperture during movement under the drum axis.

10. In a machine for manufacturing shell molds from a dry free-flowing thermosetting mold mix, the combination of a machine frame, a mold forming station comprising a drum supported to turn on a horizontal axis on said frame and having at least one mold mix discharge aperture in the peripheral surface thereof, a plate heating station comprising heating elements, and a mold ejecting station comprising mold ejecting means, a conveyor comprising a pair of endless sprocket chains, a series of guide wheels including sprockets secured to turn with said drum around which guide wheels said sprocket chains pass in parallel relation over the ejector station, around and beneath the drum sprockets at the mold forming station, through said heating station and return, a plurality of pattern plates and plate supporting trucks pivotally mounted between the sprocket chains and spaced thereon to be applied serially to close each aperture while turning under the drum axis, and guiding devices controlling the angular position of said trucks on the sprocket chains including means to present the trucks serially to the ejecting station in a wrong side up position, means swinging each said truck serially to an upright position, and means connecting said truck with the drum to form a closure for the aperture during movement under the drum axis, means maintaining an upright position of said trucks passing through said heating station, and means rotating said trucks serially to an upside-down position approaching the mold ejector station.

11. In a machine for forming molds from a dry free-flowing mold mix, the combination of a machine frame, a mold forming station comprising a drum supported to rotate on a horizontal axis on the frame and having at least one peripheral mold mix discharge aperture, a heating station comprising heating elements, a mold discharge station comprising mold discharge elements, a plurality of pattern plates and supporting trucks therefor, a conveyor on which said trucks and plates supported thereon are supported for movement serially into engagement with the drum in registry with each said aperture around and beneath the drum axis past the heating station for heating said plates and past said mold discharge station in an inverted position, each said pattern plate having a spring seated mold discharge plate and pins arranged to be acted upon by said ejector elements at the ejector station to eject the formed mold therefrom.

12. For use in a machine for forming molds from a dry free-flowing mold mix, in which pattern plates are mounted on and are moved serially on a conveyor past a plurality of mold forming, plate heating and mold ejecting stations, a mold forming device which comprises a drum in the form of a substantially rectangular box rotatable about a transverse axis centered through the end faces of the drum, said drum having in each peripheral face an aperture comprising an opening along the leading edge of the face considered in the direction of rotation and covering substantially half the width of said face, a flange to receive one of said pattern plates fitted over the edges of the opening, and hinged to open at the leading edge, and a bellows connecting the flange with said edges, the hinge for said flange being further recessed into the side of the box to provide a further outward slant to said aperture from the hinge to the leading edge of the opening.

13. A machine for manufacturing shell molds from a dry free-flowing thermosetting mold mix, which comprises a machine frame, a mold mix containing drum supported to turn on a horizontal axis on said frame and having at least one discharge aperture, a plurality of pattern plates, a plate heating means, a mold discharge station, and a conveyor on which said plates are mounted and successively moved into engagement with said drum in registry with at least one of said apertures and beneath the drum, past said plate heating means and mold discharge station, and means for driving said conveyor and the drum in synchronism with one another.

14. A carrier construction for supporting and propelling a pattern plate having a frame composed of side and end members, pattern plate supporting means mounted within said frame adjacent one face thereof, means extending beyond the borders of said frame for the connection of said carrier to a propelling member for suspended support thereby on a pivotal axis parallel to one of the end members of said frame, and further supporting means secured to said frame side members, said supporting means being spaced from said pivotal axis, and adapted to cooperate with guide members to support said carrier and define the position thereof about said pivotal axis.

15. Apparatus for the forming of shell molds including a plurality of pattern carriers each adapted to support a pattern plate, a rotatable drum having a plurality of apertures formed in the surface thereof, said apertures each corresponding in size to the size of a pattern plate, an oven, and means for propelling said carriers in an endless path which includes a portion of the periphery of said drum and extends through said oven.

References Cited in the file of this patent

UNITED STATES PATENTS

| | | |
|---|---|---|
| 1,127,113 | Thiemann | Feb. 2, 1915 |
| 1,448,203 | Cumfer et al. | Mar. 13, 1923 |
| 2,669,758 | Valyi | Feb. 23, 1954 |

OTHER REFERENCES

The Foundry, October 1950, pages 162, 164 and 168.
The Iron Age, April 19, 1951, pages 81–85.
"Steel," December 3, 1951, page 92.